United States Patent [19]  [11] 3,896,761
Di Mura  [45] July 29, 1975

[54] ACCESS AND COUPLING APPARATUS FOR MACHINE COATING THE INTERIOR OF PIPES

[76] Inventor: Gerardo Di Mura, 459 Mountain Ter., Dunellen, N.J. 08812

[22] Filed: Oct. 2, 1974

[21] Appl. No.: 511,283

[52] U.S. Cl. .............................. 118/317; 118/306.9
[51] Int. Cl.² ......................................... B05B 15/06
[58] Field of Search ............ 118/317, 2, 318, 9, 306

[56] References Cited
UNITED STATES PATENTS

| | | | |
|---|---|---|---|
| 2,758,917 | 8/1956 | Popp | 118/306 |
| 3,022,765 | 2/1962 | Xenis | 118/2 |
| 3,422,795 | 1/1969 | Smith | 118/317 X |
| 3,530,822 | 9/1970 | Di Mura | 118/9 |

Primary Examiner—Nile C. Byers, Jr.
Attorney, Agent, or Firm—Frederick W. Padden

[57] ABSTRACT

This specification and drawing discloses an arrangement for coupling an underground gas main to ground level to facilitate the spray sealing of inner walls and joints of the pipeline. The apparatus includes a base fixture fastened to the pipeline and communicating through two pipes and couplers extending upwardly to the ground level. The pipes are angularly disposed from one another for enabling a hose and spray nozzle to be sequentially admitted through the couplers, pipes and base fixture in opposite upstream and downstream directions of the pipeline for sealing operations. Each of the couplers is an angular coupling device affixed within an access enclosure. Sealer plugs are threaded into upper ends of the couplers for sealing during normal gas service.

8 Claims, 4 Drawing Figures

ACCESS AND COUPLING APPARATUS FOR MACHINE COATING THE INTERIOR OF PIPES

BACKGROUND OF THE INVENTION

This invention relates to equipment for the sealing of pipe joints in a piping system and particularly to apparatus coupling a submerged underground piping system to an access port at ground level.

It is well known that the conversion from so-called "manufactured" gas to natural gas by many public utilities has been accompanied by serious leakage problems in gas piping systems because of dehydrating action of natural gas on the packing or caulking in the joints between adjacent, contiguous sections of pipe. A number of arrangements have been proposed for solving this problem, one of the best known being the method of spraying the interior surface of a piping system with a sealing compound as described in my U.S. Pat. No. 3,530,822, issued Sept. 29, 1970 as well as G. E. Hitz U.S. Pat. No. 2,091,544, issued Aug. 31, 1937, C. P. Xenis U.S. Pat. No. 3,022,765, issued Feb. 27, 1962, and C. L. Popp U.S. Pat. No. 2,758,917, issued Aug. 14, 1956.

In typical arrangement for spray coating the interior of a selected length of underground gas main, the opposite extremities of the selected length of pipe are exposed by excavation and a hole drilled in the main at each exposed extremity. A gland is positioned over each hole to prevent leakage of gas during the coating operation and so that gas service need not be interrupted. A snake line is then passed through the gland at one extremity of the pipe and urged through the pipe to the other extremity. When the snake line reaches the latter extremity, a nozzle and hose are secured to an end of the snake line. Thereafter, the snake line is withdrawn towards its original point of entry and carries with it the nozzle and hose. While the snake line is being withdrawn, a sealing compound is forced through the hose and nozzle under pressure to coat the interior of the main. When the hose has been drawn through the entire length of gas main, the snake line and hose are disconnected and the hose is pulled out of the gas main back to its original point of entry. If desired, the spraying operation may be repeated while the hose is being withdrawn.

A problem heretofore confronting the art of sealing the interior of underground pipe systems has been the necessity for making excavations, for example, at every 100-, 200- or 300-foot intervals to obtain access to pipe sections to be sealed. These excavations involve considerable manual and machine operations and consume a substantial portion of the time required for spray sealing of the pipe system. A significant disadvantage resultant from these excavations is the high cost. In the typical case, such excavations must be made each time the pipe system is to be sealed and, in practice, such sealing desirably is made in yearly intervals. Moreover, I have experienced that these excavation activities tend to adversely affect pedestrian and vehicle traffic for extended periods of time while the digging, sealing and refilling operations are in progress. Furthermore, the refilled excavations customarily require periodic servicing to fill-in packed down surfaces and to eliminate so-called "pot holes".

Accordingly, it is apparent that a need exists for a means for reducing the high cost and extensive manual and machine operations required for excavation. A further need exists for eliminating the need for repeated excavations, for example, at the customary yearly intervals.

SUMMARY OF THE INVENTION

The foregoing problem is solved and needs fulfilled by a coupling apparatus for a sealing machine in accordance with my invention. The coupling apparatus is premanently installed in the pipe sections to be sealed and extends between the underground pipe and an access port at ground level.

According to my exemplary embodiment, an excavation is made in the ground for obtaining access to a buried gas main pipeline for an installation of my illustrative coupling apparatus. A hole is then drilled and threadedly tapped into the main pipe at its exposed portion. The threaded hole matingly interfits with a threaded extension of a base fixture of my coupling apparatus.

It is a feature of my invention that the base fixture is equipped with upwardly projecting and angular side surfaces each of which has a threaded aperture for mating and interfitting with a threaded end of a pipe. Each such pipe extends upwardly toward ground level and on an angle from the base fixture and substantially perpendicular to the apertured side surfaces of that fixture. The pipes are also threaded on respective upper end segments and are individually joined to respective angular couplers that are fastened within access enclosure at ground level. The couplers are furnished with threaded inner walls for mating and interfitting with respective threaded plugs which seal the coupling apparatus and gas main.

To spray coat the interior of a length of one end of the gas main, for example, a few hundred feet of the main in an upstream direction from the coupling apparatus, a mobile tank truck and rodding machine are driven to the vicinity of the access enclosures. The tank truck may advantageously include the rodding machine as an integral part of a single truck unit. The tank of the truck stores the sprayable sealant material. The rodding machine contains a hose wound on a reel. One end of the hose is coupled to the storage tank and a second end of the hose is fastened to an omidirectional spray nozzle. A wire is coiled about the length of the hose for rigidity and strength during storage on the reel and for projection through my coupling apparatus and the gas pipeline during spray sealing operations.

It is a feature of my invention that a craftsman initiates operations by removing one of the two sealing plugs from my coupling apparatus, attaches a suitable gland to the coupling apparatus, and then feeds the spray nozzle and hose through the gland and coupling apparatus, the pipe extending to the base fixture and therethrough its threaded extension into the gas main pipeline. After the nozzle is thus inserted, the hose is further unwound from the rodding machine reel and concurrently the spray material is coupled from the truck tank through the hose for spraying via the nozzle onto the inner walls and joints of the gas main. The hose is extended for a prescribed length in the one direction through the gas main and is then withdrawn onto the reel and optionally while the spraying operation from the nozzle is repeated. After the hose and nozzle are withdrawn, the gland is removed and the sealing plug is reinserted into the coupling apparatus.

To spray a prescribed length of the gas main in the opposite direction, for example in the downstream, direction, the operations are essentially the same except that it involves the removal of the second of the two sealing plugs and the insertion of the hose and nozzle through a second coupler and pipe as well as the base fixture of my invention.

DRAWING DESCRIPTION

The invention will be more fully understood from the following detailed description taken in conjunction with the accompanying drawing in which.

DETAILED DESCRIPTION

Figure 1:
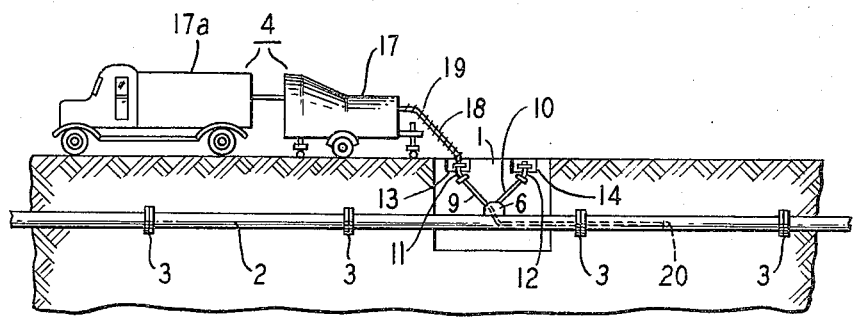
FIG. 1 illustrates a longitudinal view of a selected section of an underground gas main, partly in section, together with the access and coupling apparatus embodying novel principles of my invention.

In FIG. 1, there is shown an excavation 1 made to expose a portion of a relatively long section of buried gas main 2. The main is characterized by a number of joints 3 that are to be coated on the pipe interior by a spray coating machinery 4 in order to prevent and close leaks in the caulking of these joints.

Figure 2:
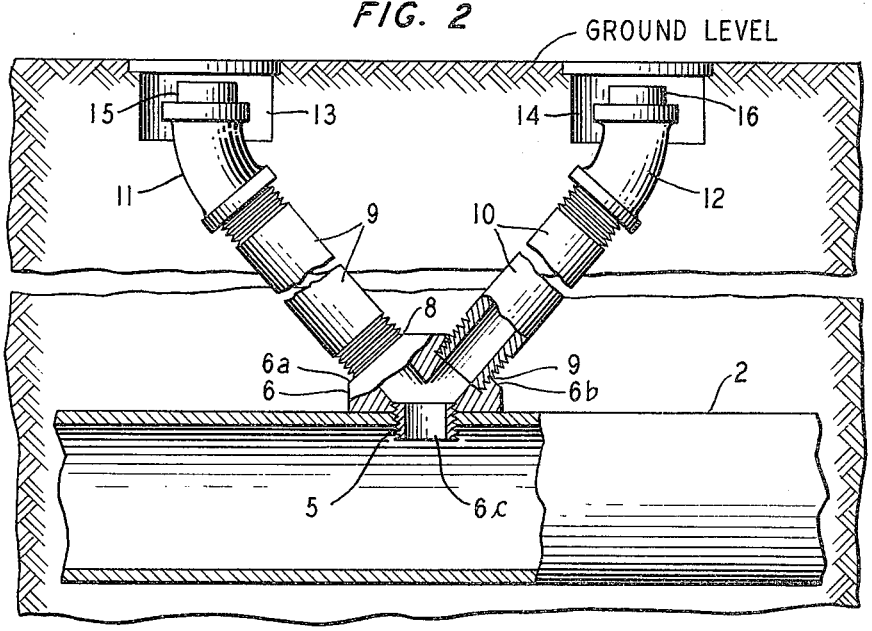
FIG. 2 is a side view of the exemplary access and coupling apparatus installed in a gas main pipe.

According to my exemplary embodiment as depicted in FIG. 2, a hole 5 is drilled in the main 2 at its exposed portion and the inner walls of the pipe main which define that hole are then threaded or tapped. A base fixture 6 of my invention having a threaded extension 6C is next matingly and threadedly secured within the threaded hole 5.

Figure 3:
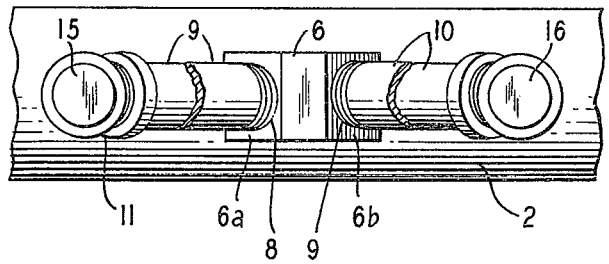
FIG. 3 is a plan view of the access and coupling apparatus.
Figure 4:
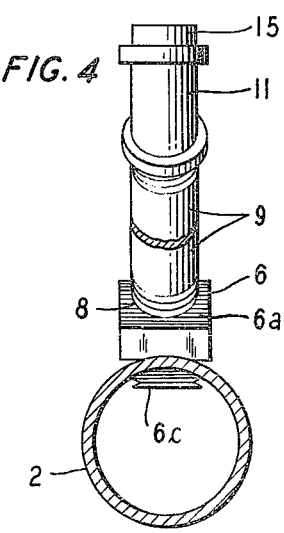
FIG. 4 depicts an end view of the access and coupling apparatus.

As shown in FIGS. 2, 3 and 4, base fixture is provided with angled side surfaces 6a and 6b having walls defining threaded apertures 7 and 8 for mating and interfitting with respective threaded ends of the straight pipes 9 and 10. These pipes extend upwardly toward ground level and on an angle from fixture 6 and substantially perpendicular to surfaces 6a and 6b. Pipes 9 and 10 are threaded on respective upper end segments and are joined to respective angular couplings, or couplers, 11 and 12 which are illustratively located slightly below ground level and within respective access enclosures 13 and 14. Couplings 11 and 12 are furnished with threaded inner wall segments for mating and interfitting with respective threaded plugs 15 and 16 which seal the access and coupling apparatus as well as the gas main 2 for normal service and while spray coating operations are not in progress.

Adjacent to the access enclosures 13 and 14 of FIG. 1 is located the spray coating machinery 4 which includes a so-called rodding machine 17 and a tank truck 17a containing a sprayable sealant material. The rodding machine contains a reel on which there is wound a relatively flexible hose 18 with a wire coil 19 embracing hose 18. One end of hose 18 is attached to the tank truck for receiving the sealant material. Another end of hose 18 is affixed to a omnidirectional spray nozzle 20 as disclosed in U.S. Pat. No. 3,530,822.

Hose 18 is unwound from rodding machine 17 by means of a suitable power source, not shown in the drawing, which may be a conventional gasoline engine contained in machine 17. As hose 18 is unwound from machine 17, it is led together with the nozzle 20 illustratively through the access enclosure 13 into coupling 11, pipe 9 and fixture 6 rightwardly through the gas main 2. Upon admission and rightward movement of the hose 18 and nozzle 20, the sealant material is coupled from tank truck 17a through the hose 18 for spraying through nozzle 20 onto the inner walls of the gas main pipeline and joints. After the nozzle has been projected rightwardly through the gas main 2 for a desired length of hose 18, the hose may be rewound onto the reel of the rodding machine 17 and while the spraying from nozzle 20 is continued.

Upon completion of the foregoing spraying, the hose 18 and nozzle 20 are withdrawn from coupling 11 and the latter is sealed by inserting the plug 15. Thereafter, the plug 16 is removed to enable the hose 18 and nozzle 20 to be admitted through the hollow interior of coupling 12, pipe 10, fixture 6 and its extension 6a leftwardly through the gas main 2 for spray coating the interior of main 2 and its joints 3 in a manner as already explained for the rightward movement of the nozzle 20.

From the foregoing, it is clearly an advantage of my invention that the foregoing spray sealing operations are accomplished at ground level without entering the excavation 1 except for the initial installation of the access and coupling apparatus of my invention. In fact, after my exemplary access and coupling apparatus are affixed to the gas main 2, the excavation can be refilled and the ground surface, for example, of a road repaved. Obviously, whenever sealing operations are thereafter desired, it is no longer necessary to excavate, but advantageously, the operations may be accomplished by removing cover plates of the access enclosures 13 and 14 and respective plugs 15 and 16. As a consequence, time and expense of excavation are eliminated for repeat sealings and economical sealing is attainable without the prolonged prior art traffic congestion problems. Moreover, less complicated and multipersonnel sealing operations are obtained with my illustrative access and coupling apparatus.

It is to be understood that the above-described arrangements are illustrative of the principles of my invention. In light of my teaching, numerous other arrangements may be devised by those skilled in the art without departing from the spirit and scope of my invention.

What is claimed is:

1. Apparatus for coupling a buried pipeline toward ground level for machine spray coating and the interior of the pipeline and its joints and without a need for an excavation to the pipeline after installation of the coupling apparatus and comprising
    a base fixture fastenable to said pipeline, and
    a pair of conduits secured to said base fixture and angularly disposed from one another for extending upward from said fixture toward ground level to enable a hose and spray nozzle to be sequentially admitted through each of said conduits and said base fixture in opposite upstream and downstream directions of said pipeline for spray coating operations.

2. The invention of claim 1 further comprising
    a pair of angular couplers, each one of which is individually secured to one of said conduits for enabling said hose and nozzle to be sequentially admitted and substantially at ground level into said one coupler before admission into said one of said conduits.

3. The invention of claim 2 further comprising a pair of access enclosures, each one of which encloses an individual one of said couplers substantially at ground level, and means for plugging each of said couplers to seal said pipeline and coupling apparatus for normal pipeline service.

4. The invention of claim 2 wherein said base fixture comprises
   a threaded extension for matingly interfitting with a tapped hole in said pipeline, and
   angular side surfaces each of which includes means defining a threaded aperture.

5. The invention of claim 4 wherein each of said conduits comprises a pipe having threaded end portions and one of said threaded end portions matingly interfitting with said threaded aperture of an individual one of said angular side surfaces.

6. The invention of claim 5 wherein each of said angular couplers comprises means defining a threaded portion for matingly interfitting with another of said threaded end portion of an individual one of said pipe conduits.

7. The invention of claim 6 wherein each of said angular couplers comprises means defining another threaded end portion and wherein said means for plugging includes a pair of threaded plugs for matingly interfitting with the other threaded end portions of each of said angular couplers.

8. Apparatus for spray coating the interior walls and joints of a section of buried pipeline substantially from a ground level location without a need for an excavation to the pipeline after installation and comprising
   coupler apparatus including a pair of conduits angularly disposed from one another and extending communicatingly with and upwardly from said buried pipeline toward substantially ground level, and
   hose and nozzle means insertable at ground level sequentially through each of said conduits into opposite upstream and downstream directions of said pipeline for spray coating operations.

* * * * *